Oct. 27, 1964  C. F. SCHUH ET AL  3,153,939
COUPLING MEANS
Original Filed June 3, 1955
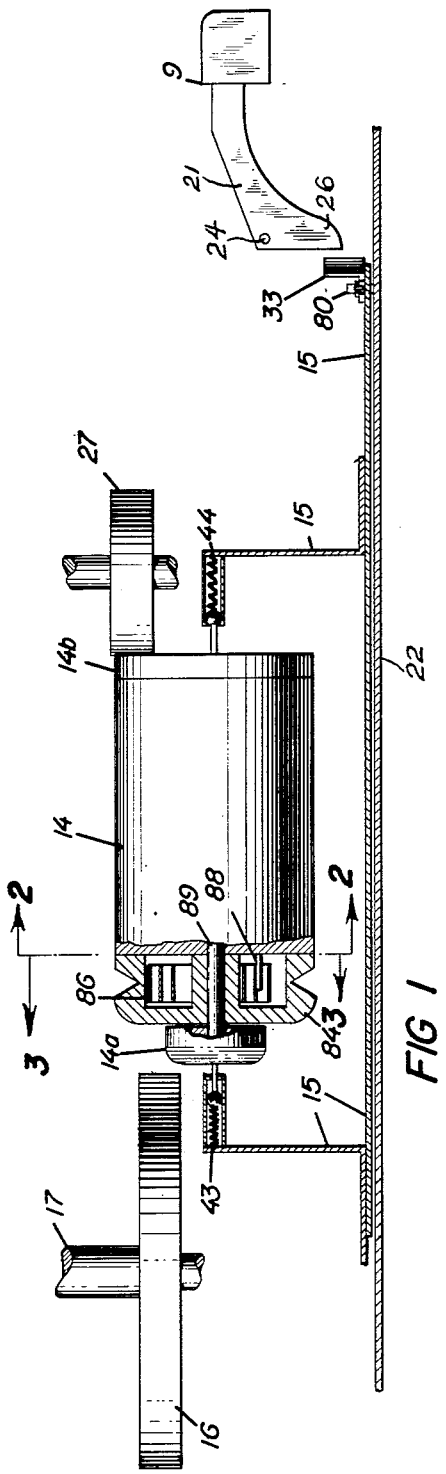
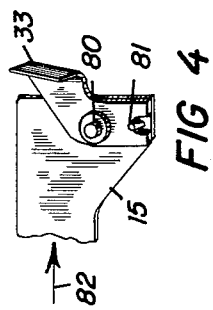
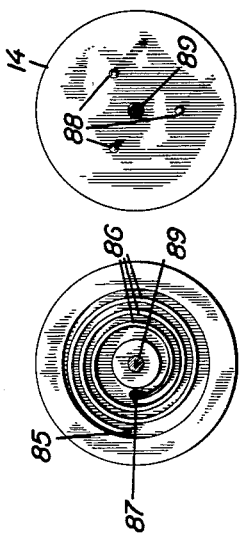
INVENTORS
Carl F Schuh
Ernst Genning
Günther Herrmann
by Wenderoth, Lind & Ponack
ATTORNEYS United States Patent Office 3,153,939
Patented Oct. 27, 1964

3,153,939
COUPLING MEANS
Carl Friedrich Schuh, Landshut, Lower Bavaria, Ernst Genning, Fassberg, near Celle, and Günther Herrmann, Ronnenberg, Hannover, Germany, assignors to Protona Productionsgesellschaft für elektroakustische Geräte G.m.b.H., Hannover, Germany
Original application June 3, 1955, Ser. No. 513,056, now Patent No. 3,016,244, dated Jan. 9, 1962. Divided and this application Nov. 6, 1961, Ser. No. 150,551
Claims priority, application Germany, July 29, 1954, P 12,426
5 Claims. (Cl. 74—202)

This application is a division of our application Serial No. 513,056 filed June 3, 1955, now Patent No. 3,016,244, entitled "Miniature Magnetic Sound Recording and Reproducing Device."

An object of the invention is to provide a coupling roller having a particularly simple construction for reversing the drive of two spaced elements.

A further object of the invention is to mount a coupling roller upon a sliding member which may be moved in two directions in order to frictionally connect it either with a forward driving plate or with a rewinding plate such as is used particularly in sound recording and reproducing devices.

A further object of the invention is to provide a coupling roller which may bear with a definite pressure against the plates to be driven A further object of the invention is to provide friction surfaces upon such roller so that they do not become worn and that compensation for wear and tear is continually made when the coupling roller is pressed resiliently against the means which are to be driven thereby assuring a perfect drive.

A still further object of the invention is to provide compensations for irregularities in the speed of rotation which may be occasioned by motor regulation and therefore the coupling roller comprises a centrifugal mass and a driving roller resiliently coupled therewith.

With the above and other objects in view which will become apparent from the detailed description below, one form of the invention is shown in the drawings in which:

FIGURE 1 is a side elevational view.

FIGURE 2 is a cross-sectional view taken upon section line 2—2 of FIGURE 1 looking in the direction of the arrows.

FIGURE 3 is a cross-sectional view taken upon section line 3—3 of FIGURE 1 looking in the direction of the arrows, and FIGURE 4 is a perspective view of a detail showing a means for reciprocating the coupling roller from one position to another.

The coupling roller 14 is mounted upon a shaft 89 and two springs 43 and 44 always resiliently urge the coupling roller 14 against the plates 16 or 27 even after wear of the friction facing 14a for the forward motion or the facing 14b for the rewind motion. These facings may be made of rubber or Perbunan or any other similarly suitable material. The plates 16 and 27 may carry spools for tape recording means or any other type of sound carrier but the invention is not limited to such a construction since the coupling means may be utilized in any desired mechanism.

When the plate 15 upon which the roller and associated mechanism is mounted is moved so as to place the facing 14a in contact with the plate 16, then the spring 43 is out of action and when the facing 14b is placed in contact with the plate 27 the spring 44 is out of action.

The means for driving the coupling roller 14 comprises a driving roller 84 which is resiliently connected with the coupling roller 14. The driving roller 84 on the side facing the coupling roller 14 is provided with a recess which contains a spiral spring 86 secured at one end at the point 85 of the inner wall of such recess. The other end of the spiral spring 86 terminates inwardly in a hook 87. The driving roller 84 which may be driven by any desired means and is shown with a V-shaped recess in its periphery to accommodate a belt from a driving motor rotates about the shaft 89 of the coupling roller 14. The coupling roller which is formed as a centrifugal mass is provided as shown in FIGURE 2 with pins 88 extending from its front wall. If the driving roller 84 is moved along the axis 89 of the coupling roller and is rotated relative to the coupling roller 14 then one of these pins 88 will engage in the hook 87 of the driving roller so that the driving roller 84 will resiliently take up the coupling roller 14., Usually the spiral spring is so proportioned that it allows approximately a complete revolution of the coupling roller 14 relative to the driving roller 84 but of course the amount of revolution may be adjusted as desired for the circumstances in which the coupling roller may be used.

The coupling roller is mounted upon a support 15 which is slidably mounted upon a base 22. Any particular means may be used to slide the support from either a position where the plate 16 is rotated or to a position where the plate 27 is rotated. Such a means is shown at the right of FIGURE 1 and in FIGURE 4 wherein a pivoted lever 33 is mounted upon a fixed pin 80 accommodated in a slot upon the plate 15 and such lever is provided with another slot at the end of its free arm in which there is a pin 81 fixed to the plate 15. When the lever 21 is pivoted about the fixed pivot 24 by depressing a button 9 the projection 26 upon the lever 21 will contact the lever 33. It is obvious that any type of manual or automatic means may be designed in order to bring the coupling roller 14 either into contact with one element such as the plate 16 or another element such as the plate 27. The drive of the plate 16 and the drive of the plate 27 may be varied as desired by providing different diameters of contacting surfaces. As shown the facing 14a has a relatively small diameter as compared with the facing 14b. Therefore the plate 16 will be driven at a slower speed than the plate 27. The relative speeds given to the plates 16 and 27 may be accordingly varied as desired or may be uniform depending upon the diameter of the contacting surfaces provided.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. Coupling means for magnetic sound recording devices for reversing the drive thereof comprising a roller of sufficient mass to serve as a flywheel, a slidable shaft upon which said roller is mounted, a driving roller adjacent said first mentioned roller rotatably mounted on said shaft, a spiral spring upon said driving roller having one end fixed thereto and means on the other end of said spiral spring for selectively engaging said first mentioned roller.

2. Coupling means for magnetic sound recording devices for reversing the drive thereof comprising a roller of sufficient mass to serve as a flywheel, a slidable shaft upon which said roller is mounted, a driving roller adjacent said first mentioned roller rotatably mounted on said shaft, a spiral spring upon said driving roller having one end fixed thereto, means on the other end of said spiral spring for selectively engaging said first mentioned roller, a pair of spaced rotatably mounted plates and a facing fixed to each end of said shaft movable with said first mentioned roller for selectively engaging said plates.

3. Coupling means for magnetic sound recording devices for reversing the drive thereof comprising a roller of sufficient mass to serve as a flywheel, a slidable shaft upon which said roller is mounted, a driving roller adjacent said first mentioned roller rotatably mounted on said shaft, a spiral spring upon said driving roller having one end fixed thereto, means on the other end of said spiral spring for selectively engaging said first mentioned roller, a pair of spaced rotatably mounted plates, a facing fixed to each end of said shaft movable with said first mentioned roller for selectively engaging said plates and means for sliding said shaft to selectively engage said facings with said plates.

4. Coupling means for magnetic sound recording devices for reversing the drive thereof comprising a roller of sufficient mass to serve as a flywheel, a slidable shaft upon which said roller is mounted, a driving roller adjacent said first mentioned roller rotatably mounted on said shaft, a spiral spring upon said driving roller having one end fixed thereto, means on the other end of said spiral spring for selectively engaging said first mentioned roller, a pair of spaced rotatably mounted plates, a facing fixed to each end of said shaft movable with said first mentioned roller for selectively engaging said plates, means for sliding said shaft to selectively engage said facings with said plates and means to resiliently urge the engaged facing against the engaged plate.

5. Coupling means for magnetic sound recording devices for reversing the drive thereof comprising a roller of sufficient mass to serve as a flywheel, a slidable shaft upon which said roller is mounted, a driving roller adjacent said first mentioned roller rotatably mounted on said shaft, a spiral spring upon said driving roller having one end fixed thereto, means on the other end of said spiral spring for selectively engaging said first mentioned roller, a pair of spaced rotatably mounted plates, a facing fixed to each end of said shaft movable with said first mentioned roller for selectively engaging said plates, means for sliding said shaft to selectively engage said facings with said plates, and means to resiliently urge the engaged facing against the engaged plate, said facings being of different diameters to provide different speeds for driving said plates.

References Cited in the file of this patent

UNITED STATES PATENTS

| 757,891 | Daily | Apr. 19, 1904 |
| 782,890 | Zumdahl | Feb. 21, 1905 |
| 1,817,758 | McSheen | Aug. 4, 1931 |
| 1,962,303 | Greibach | June 12, 1934 |

FOREIGN PATENTS

| 386,137 | Great Britain | Jan. 12, 1933 |